L. Hull,
Gage Lathe
No. 56,419.
Patented July 17, 1866.
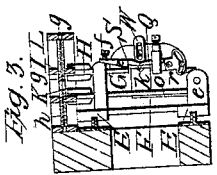
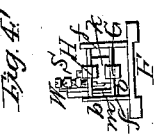
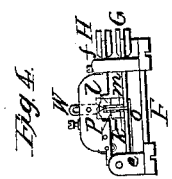
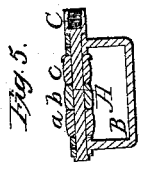
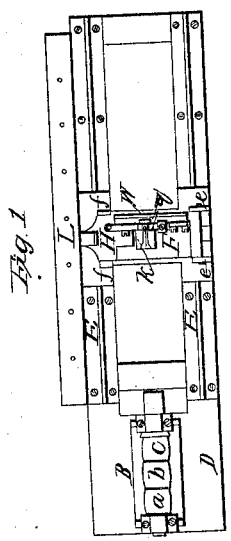
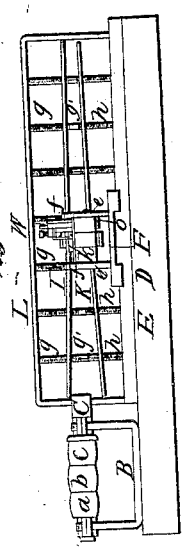
Witnesses
Samuel N. Piper
Curtis
Inventor
Liveras Hull
by his attorney
R. M. Ubly

UNITED STATES PATENT OFFICE.

LIVERAS HULL, OF CHARLESTOWN, MASSACHUSETTS.

IMPROVEMENT IN LATHES FOR TURNING WHIP-STOCKS.

Specification forming part of Letters Patent No. 56,419, dated July 17, 1866.

*To all whom it may concern:*

Be it known that I, LIVERAS HULL, of Charlestown, in the county of Middlesex and State of Massachusetts, have invented a new and useful Machine for Turning a Whip-Stock; and I do hereby declare the same to be fully described in the following specification, and represented in the accompanying drawings, of which—

Figure 1 is a top view, Fig. 2 a front elevation, and Fig. 3 a transverse section, of it; Fig. 4, a back view or elevation of its cutter-carriage. Fig. 4' is a rear end elevation of the cutter-carriage.

In such drawings, A is a mandrel supported in a standard or puppet, B, and carrying on its inner end a chuck, C, a longitudinal section of which is shown in Fig. 5, such chuck having a female screw cut on it to enable it to be screwed upon the butt-end of a whip-stock.

Whip-stocks designed to be trimmed to a conical form by this machine are such as are composed of long strips or pieces of rattan arranged in or making a fasces or bundle, and glued together and upon a strip of whalebone to extend from them. The mandrel may have one or more driving or fast and loose pulleys, $a\ b\ c$, upon it for receiving a belt from a suitable motor.

The puppet B is fixed in a frame, D, which has two parallel rails, E E, arranged on it in manner as represented. A carriage, F, rests on such rails, and is to be applied to them so as to be capable of being guided by and moved on them in the direction of their length, and either toward or away from the chuck C.

Two furcated levers, G H, one of which is placed directly over the other, are hinged to standards $e\ e$, raised upon the carriage F, and so as to be capable of being turned either up or down in a vertical plane. These levers work between and against vertical guides $f\ f$, erected on the carriage, and their forked ends embrace the edges of two flexible pattern or guide bars, I K, which are arranged in a vertical frame, L, in manner as represented. These bars I K are supported by a series of vertical right-and-left adjusting-screws, $g\ g\ g\ h\ h\ h$. Each right screw is connected with a left screw or formed on the same rod with it, that part, $g'$, of the rod which is between the two screws thereof being square or prismatic in form, in order that a key or wrench may be applied to it for the purpose of revolving the two screws simultaneously. All the screw-rods are to be so fixed to the frame L as to be capable of being revolved therein without having any endwise movement, the same being to enable the pattern-bars to be adjusted by the screws in such manner and with reference to each other as circumstances may require for the production of the requisite taper of a whip-stock.

As the carriage is screwed on its supporting-rails the pattern-bars will cause the furcated levers either to approach toward or recede from one another, each being moved a like distance in a given time.

On the middle of the lower lever is a block or standard, $k$, to which a notched V-piece, $l$, is applied, so as to be capable of moving freely in a vertical direction, such part $l$ being provided with a leg, $m$, to rest on a spring, $o$, applied to the lever. It is in the notch $p$ in the upper part of the V-piece that the turned part of the whip-stock rests close to the gouge or cutter, which is represented at $q$. The said cutter is secured in an adjustable lever, $r$, whose fulcrum extends from the upper of the two furcated levers. Furthermore, there is applied to the said upper furcated lever another adjustable lever or throat-piece, $s$, one arm of which extends over the cutter and serves as a gage to regulate the depth of its cut or the thickness of the shaving to be taken by the cutter. Each of the levers $r\ s$, formed as exhibited in the drawings, is provided with a set-screw, such being as shown at $u$ and $v$. Furthermore, there is applied to the upper of the furcated levers a slide, $w$, such slide being arranged immediately or about over the V-piece, and being so affixed to the lever as to be capable of being adjusted thereon vertically or nearer to or farther from the V-piece, as circumstances may require.

The V-piece, besides serving to support and aid in centralizing the whip-stock, operates to keep it in contact with the lower end of the slide $w$, in order that it may be properly presented to the cutter. The V-piece, being self-adjusting in consequence of being supported on a spring, will adapt it to the whip-stock from time to time and keep it in its proper position for the cutter to act on it.

The cutter-carriage may be moved by manual power, or by suitable mechanism applied to it and the supporting-frame.

The machine above described has been found very effective for accomplishing the necessary reduction of a whip-stock preparatory to its further reduction by the finishing or dressing lathe, as described in Letters Patent No. 53,003, granted to me on the 6th day of March, 1866.

The work done by the present machine has usually been accomplished by planes or other tools in the hands of a workman.

In operating with the machine the butt of the whip-stock is first to be inserted and fixed in the chuck, after which the smaller end of the whip-stock is to be laid in the notch of the V-piece. The mandrel is next to be set in revolution, so as to revolve the whip-stock, and the cutter-carriage is to be moved gradually toward the chuck. As it proceeds the pattern-bars will cause the furcated levers to gradually recede from each other in such manner as to enable the cutter to reduce the stock to the necessary conical form or taper.

I claim as my invention for the purpose set forth—

1. The combination as well as the arrangement of the two adjustable pattern-bars I K, the furcated levers G H, the carriage F, its ways or guides E E, the mandrel A, and chuck C, or the equivalent of the latter, the cutter $q$, and the self-adjusting V-piece $l$, and also the combination of the same and the slide $w$.

2. The combination and arrangement of the adjustable throat lever or piece $s$ with the cutter $q$, when applied to the upper furcated lever so as to be adjustable thereon, as specified.

LIVERAS HULL.

Witnesses:
   R. H. EDDY,
   F. P. HALE, Jr.